US006883766B1

(12) United States Patent
Ziaylek et al.

(10) Patent No.: US 6,883,766 B1
(45) Date of Patent: Apr. 26, 2005

(54) QUICK RELEASE MECHANICAL BRACKET

(76) Inventors: Michael Paul Ziaylek, 15 Cold Spring Ave., Yardley, PA (US) 19067; Theodore Ziaylek Jr., 140 Riverview Dr., Yardley, PA (US) 19067; Theodore P. Ziaylek, 152 Riverview Ave., Yardley, PA (US) 19067

( * ) Notice: Subject to any disclaimer, the term of this patent is extended or adjusted under 35 U.S.C. 154(b) by 0 days.

(21) Appl. No.: 10/669,201

(22) Filed: Sep. 24, 2003

(51) Int. Cl.[7] .......... F16M 13/00

(52) U.S. Cl. .......... 248/313; 248/311.2; 248/316.1; 248/154

(58) Field of Search .......... 248/154, 313, 248/311.2, 316.1, 316.5; 297/191; 169/51; 224/148; 211/75

(56) References Cited

U.S. PATENT DOCUMENTS

| | | | | |
|---|---|---|---|---|
| 2,109,821 A | | 3/1938 | Dunica | |
| 2,431,698 A | | 12/1947 | Lombard | |
| 3,194,529 A | | 7/1965 | Brock | |
| 3,547,391 A | | 12/1970 | Johnson | |
| 3,603,550 A | | 9/1971 | Byrd | |
| 3,737,133 A | | 6/1973 | Boecker | |
| 3,765,635 A | | 10/1973 | Burrell et al. | |
| 3,780,972 A | | 12/1973 | Brodersen | |
| 3,823,907 A | | 7/1974 | Ziaylek, Jr. | |
| 3,921,950 A | | 11/1975 | Sentinella | |
| D244,392 S | | 5/1977 | Montambo | |
| 4,023,761 A | | 5/1977 | Molis | |
| D245,929 S | | 9/1977 | Montambo | |
| 4,213,592 A | | 7/1980 | Lingenfelser | |
| 4,304,383 A | | 12/1981 | Huston | |
| D267,227 S | * | 12/1982 | Ziaylek, Jr. | D8/373 |
| 4,420,262 A | * | 12/1983 | Sterrenberg | 366/110 |
| 4,555,083 A | | 11/1985 | Carter | |
| 4,586,687 A | | 5/1986 | Ziaylek, Jr. | |
| 4,821,990 A | | 4/1989 | Porter et al. | |
| 4,848,714 A | * | 7/1989 | Ziaylek et al. | 248/313 |

(Continued)

FOREIGN PATENT DOCUMENTS

| | | |
|---|---|---|
| DE | EP0272494 | 10/1988 |
| DE | EP0284884 | 12/1988 |
| DE | EP0312285 | 4/1989 |
| DE | EP0334265 | 9/1989 |
| DE | EP0629391 | 12/1994 |
| EP | 0903162 | 2/2000 |
| JP | 11105704 | 4/1999 |
| JP | 11314583 | 11/1999 |
| JP | 2001158344 | 6/2001 |

*Primary Examiner*—Kimberly Wood
(74) *Attorney, Agent, or Firm*—Sperry, Zoda & Kane

(57) ABSTRACT

A mechanical bracket is provided for providing enhanced quick release for attaching and detaching of a tank such as a air tank with respect thereto usually by emergency workers such as firemen and the like. The tank includes a secure clamping mechanism for firmly and fixedly and yet detachably securing a tank preferably vertically relative to a wall wherein two driveshafts are rotatable between a closed position holding the tank and an open position releasing the tank. A uniquely designed guide boss configuration is fixedly secured to the frame immediately behind each driveshaft to prevent lateral flexing thereof which normally occurs when a tank is firmly clamped therebetween. Each guide boss preferably includes at least one profile guide surface partially encircling the adjacent driveshaft to minimize flexing thereof and is spaced therefrom at approximately five to ten thousandths of an inch for controlling such flexing.

16 Claims, 5 Drawing Sheets

U.S. PATENT DOCUMENTS

| | | | | | |
|---|---|---|---|---|---|
| 4,979,659 | A | | 12/1990 | Boyd | |
| 5,025,935 | A | | 6/1991 | Hadachek | |
| D347,735 | S | | 6/1994 | Ziaylek, Jr. et al. | |
| 5,318,266 | A | | 6/1994 | Liu | |
| 5,354,029 | A | | 10/1994 | Ziaylek, Jr. et al. | |
| 5,522,530 | A | | 6/1996 | Boettcher | |
| 5,533,701 | A | | 7/1996 | Trank | |
| D394,381 | S | | 5/1998 | Ziaylek, Jr. et al. | |
| 6,086,312 | A | * | 7/2000 | Ziaylek et al. | 414/462 |
| 6,124,796 | A | | 9/2000 | Hincher | |
| 6,220,557 | B1 | | 4/2001 | Ziaylek et al. | |
| 6,318,568 | B1 | | 11/2001 | Mc Cord | |
| 6,520,123 | B2 | | 2/2003 | Parker et al. | |
| 6,543,736 | B2 | * | 4/2003 | Field | 248/313 |
| 6,702,242 | B1 | * | 3/2004 | Ziaylek et al. | 248/311.2 |
| D494,049 | S | * | 8/2004 | Ziaylek et al. | D8/373 |

* cited by examiner

QUICK RELEASE MECHANICAL BRACKET

BACKGROUND OF THE INVENTION

1. Field of the Invention

The present invention relates generally to brackets or other holding or supporting mechanisms preferably capable of being detachably secured with respect to a cylindrical air tank or cylinder of the type that is carried on the back of a firefighter or rescue squad member or other similar emergency worker.

Devices of this type are widespread in usage especially among emergency workers and normally are held in vertical position against the walls of firehouses or are kept in containers stored in truck compartments or in the rescue squad buildings or firehouses. Organized orderly storage of such tanks is very important in view of the fact that each one is assigned to an individual emergency worker. As such, such tanks need to be mounted vertically in firehouses, in fire trucks and in other places where emergency equipment is stored. In this manner a swift and convenient access to cylinders of this type is made possible.

The present invention more particularly relates to a device for preventing the flexing of vertically extending rotatable driveshafts which cause movement of the tank gripping means between the open position releasing the tank and the closed position holding the tank. In the closed position a great amount of force is placed laterally on these driveshafts and to prevent them from flexing the present invention provides a unique advancement over the prior art by the positioning of specifically designed generally arcuate guide bosses immediately adjacent each driveshaft to prevent outward lateral flexing thereof away from the tank storage zone.

2. Description of the Prior Art

Many patents have been granted on mechanical holding brackets for cylindrical tanks such as air tanks with various configurations for detachably securing the tanks to a vertical surface such as wall. Some of the most relevant prior art is shown in the following patents. See U.S. Pat. No. 2,109,821 patented Mar. 1, 1938 to R. W. Dunica on a "Fire Extinguisher Holder"; and U.S. Pat. No. 2,431,698 patented Dec. 2, 1947 to H. Lombard on a "Removable Mounting Installation; and U.S. Pat. No. 3,194,529 patented Jul. 13, 1965 to G. R. Brock and assigned to Sterling Precision Corporation on a "Bracket For Holding Fire Extinguishers"; and U.S. Pat. No. 3,547,391 patented Dec. 15, 1970 to Donald E. Johnson on a "Quick Release Support For Rescue; and U.S. Pat. No. 3,603,550 patented Sep. 7, 1971 to Clarence D. Byrd and assigned to Lacy J. Miller Machine Company, Inc. on a "Quick Release Support; and U.S. Pat. No. 3,737,133 patented Jun. 5, 1973 to Allan J. Boecker and assigned to Akron Brass Company on a "Quick-Release Article Holder; and U.S. Pat. No. 3,765,635 patented Oct. 16, 1973 to Wayne R. Burrell et al and assigned to Burrell Bros., Inc. on a "Bracket For Gas Containers And Similar Tanks; and U.S. Pat. No. 3,780,972 patented Dec. 25, 1973 to John C. Brodersen on a "Mounting Apparatus For Gas Containers"; and U.S. Pat. No. 3,823,907 patented Jul. 16, 1974 to Theodore Ziaylek, Jr. on a "Positive Locking Device"; and U.S. Pat. No. 3,921,950 patented Nov. 25, 1975 to Victor Edward Sentinella on "Extinguisher Mountings"; and U.S. Design Pat. Des. No. 244,392 patented May 17, 1977 to Roger Jay Montambo and assigned to The Ansul Company on a "Combined Fire Extinguisher And Bracket; and U.S. Pat. No. 4,023,761 patented May 17, 1977 to John Molis on an "Adjustable Bracket To Stabilize Upright Compressed Gas Containers Against Displacement On Mobile Vehicles And Ship-Board Installations And Maintenance Shops"; and U.S. Design Pat. Des. No. 245,929 patented Sep. 27, 1977 to Roger Jay Montambo and assigned to The Ansul Company on a "Fire Extinguisher Bracket"; and U.S. Pat. No. 4,213,592 patented Jul. 22, 1980 to Daniel J. Lingenfelser and assigned to Caterpillar Tractor Co. on a "Bracket Assembly For Mounting Fire Extinguishers Thereon"; and U.S. Pat. No. 4,304,383 patented Dec. 8, 1981 to Paul O. Huston on a "Bracket For Holding A Tank"; and U.S. Design Pat. Des. No. 267,227 patented Dec. 14, 1982 to Theodore Ziaylek, Jr. and assigned to Ziamatic Corporation on a "Support Bracket For A Gas Cylinder"; and U.S. Pat. No. 4,555,083 patented Nov. 26, 1985 to Frank D. Carter on a "Scuba Tank Positioner"; and U.S. Pat. No. 4,586,687 patented May 6, 1986 to T. Ziaylek, Jr. on an "Air Tank Support Of The Quick Release Type; and U.S. Pat. No. 4,821,990 patented Apr. 18, 1989 to Toney L. Porter et al on a "Flashlight Holder"; and U.S. Pat. No. 4,979,659 patented Dec. 25, 1990 to Kenneth B. Boyd on an "Air Bottle Support Harness"; and U.S. Pat. No. 5,025,935 patented Jun. 25, 1991 to Josh L. Hadachek on a "Portable Upright Scuba Cylinder Retention Rack"; and U.S. Pat. No. 5,318,266 patented Jun. 7, 1994 to Hui-Long Liu on a "Drink Holder"; and U.S. Design Pat. No. Des. 347,735 patented Jun. 14, 1994 to Theodore Ziaylek, Jr. et al on a "Quick Release Support Tank Bracket"; and U.S. Pat. No. 5,522,530 patented Jun. 4, 1996 to Carl A. Boettcher on a "Hand Truck Sentry System"; and U.S. Pat. No. 5,533,701 patented Jul. 9, 1996 to Robert D. Trank on a "Foldable Stabilizing Bracket For Compressed Air Tanks"; and U.S. Pat. No. 5,354,029 patented Oct. 11, 1994 to Theodore Ziaylek, Jr. et al on a "Quick Release Tank Support Bracket With Positive Locking Engagement Means"; and U.S. Design Pat. No. Des. 394,381 patented May 19, 1998 to Theodore Ziaylek, Jr. et al on a "Tank Bracket"; and U.S. Pat. No. 6,124,796 patented Sep. 26, 2000 to William Hincher on a "Fire Equipment Bracket Having Integral Locating Beacon"; and U.S. Pat. No. 6,220,557 patented Apr. 24, 2001 to Michael P. Ziaylek et al and assigned to Michael P. Ziaylek, Theodore Ziaylek, Jr. and Theodore P. Ziaylek on a "Mounting Bracket Means For Detachably Supporting A Generally Cylindrically-Shaped Member Upon A Wall Surface"; and U.S. Pat. No. 6,318,568 patented Nov. 20, 2001 to Anthony Mc Cord and assigned to L'Air Liquide, Societe Anonyme pour l'Etude et l'Exploitation des Procedes on an "Installation For Storing And Holding Gas Cylinders"; and U.S. Pat. No. 6,520,123 patented Feb. 18, 2003 to Philip A. Parker et al on an "Expansion Cage"; and U.S. Pat. No. 6,543,736 patented Apr. 8, 2003 to Bradley J. Field and assigned to Pacific Safety Products Inc. on a "Quick Release Supporting Apparatus For A Canister"; and European Patent EP0272494 B1 patented Mar. 27, 1991 to Helmut Gerhard and assigned to Westerwalder Eisenwerk Gerhard GmbH on a "Temperature-controlled Tank Container"; and European Patent No. EP0284884 B1 patented Nov. 13, 1991 to Helmut Gerhard and assigned to Westerwalder Eisenwerk Gerhard GmbH on a "Tank Container"; and European Patent No. EP0312285 B1 patented Apr. 3, 1991 to Robin Ernest Fossey on a "Container Design Limited"; and European Patent Application No. EP0334265 A1 filed Mar. 20, 1989 to Helmut Gerhard and assigned to Westerwalder Eisenwerk Gerhard GmbH on a "Tank Container"; and European Patent No. EP0629391 B1 patented Aug. 27, 1997 to Michael M. Locarno and assigned to Bel-Art Products, Inc. on an "Oxygen Tank Holder For Use With Wheelchairs"; and European Patent Application No. JP11105704 A filed Oct. 6, 1997 to Shigeyoshi Asari and assigned to Hino Motors Ltd on an "Air Tank Fixing Structure of Vehicle".

SUMMARY OF THE INVENTION

The present invention provides an improved mechanical bracket which can quickly open or close for detachably securing a tank such as a cylindrical air tank therewithin. The bracket will preferably include a frame made of aluminum which extends generally vertically. This frame will preferably include an upper flange extending outwardly therefrom as well as a lower flange extending outwardly therefrom. Preferably there will be a significant spacing between the upper flange and the lower flange to define the tank holding zone vertically therebetween. In the preferred configuration disclosed herein the upper flange is positioned adjacent to the upper end of the frame and the lower flange is positioned near the lower end of the frame.

A securement mechanism is also included preferably for the purpose of facilitating mounting of the frame with respect to environmental structure such as walls, doors or seat-backs. This securement apparatus preferably includes an upper securement mechanism such as a bolt and hole design positioned adjacent the upper flange as well as a lower securement mechanism similarly configured positioned adjacent to the lower flange to facilitate fixed securement of the frame relative to environmental structure. An intermediate securement mechanism may also be included at an intermediate position below the upper securement mechanism and above the lower securement mechanism. These three separate securement devices will be operative to facilitate firm and fixed mounting of the frame with respect to environmental structure as needed.

The bracket further includes a first driveshaft made of steel preferably and rotatably mounted within the upper flange and rotatably mounted within the lower flange and extending therebetween adjacent to the tank holding zone.

The mechanical bracket preferably will also include a second driveshaft which is also preferably made of steel which is rotatably mounted within the upper flange at a position laterally spatially disposed from the first driveshaft. This second driveshaft is preferably rotatably mounted within the lower flange at a position spatially disposed laterally from the first driveshaft also. In this manner the second driveshaft can extend vertically between the upper and lower flanges at a position laterally displaced from the first driveshaft. The second driveshaft and the first driveshaft will preferably extend vertically approximately parallel with respect to one another in order to further define the tank holding zone therebetween.

A tank clamping mechanism is also preferably secured to the first driveshaft means and the second driveshaft means and is movable therewith between a closed position retaining a tank in the tank holding zone and an open position allowing release of the tank for removal thereof from the tank holding zone.

The tank clamping means preferably includes at least two clamping members. First included is an upper tank clamping member which includes a first upper clamping arm and a second upper clamping arm. The first upper clamping arm is secured to the driveshaft at a position thereon closer to the upper flange than the lower flange and the second upper clamping arm is secured to the second driveshaft at a position thereon closer to the upper flange than to the lower flange.

The tank clamping mechanism preferably also includes a lower tank clamping member including a first lower clamping arm and a second lower clamping arm. The first lower clamping arm is secured to the first driveshaft at a position thereon closer to the lower flange than to the upper flange and the second lower clamping arm is secured to the second driveshaft at a position thereon closer to the lower flange than the upper flange.

A first guide boss is preferably included which is made in the preferred configuration of aluminum and is formed integrally with the frame below the upper flange and above the lower flange. As such, the first guide boss is preferably located at a position intermediate between the upper and lower flanges and immediately adjacent to the first driveshaft in order to facilitate maintaining of structural integrity of the frame and minimize lateral deflecting of the first driveshaft. The first guide boss preferably defines a first profiled guide surface which is preferably of an arcuate shape and is at least partially positioned encircling the first driveshaft and is positioned thereadjacent for controlling lateral deflection. The first profiled guide surface of the first guide boss is positioned adjacent to the first driveshaft diametrically opposite from the location of the tank holding zone in order to restrict lateral flexing of the first driveshaft away from the tank holding zone. The first profiled guide surface of the first guide boss is preferably laterally spaced from the first driveshaft at a distance of approximately five thousandths of an inch to ten thousandths of an inch. The first profiled guide surface of the first guide boss preferably extends through an arc of approximately 120 degrees to further limit this lateral deflecting of the first driveshaft. The first guide boss is preferably also located at an intermediate position adjacent to the first driveshaft below the first upper clamping arm and above the first lower clamping arm in order to minimize lateral deflecting of the driveshaft furthermore. The first guide boss is preferably positioned at a location halfway between the upper flange thereabove and the lower flange therebelow. In the preferred configuration the first profiled guide surface includes a first upper guide edge and a first lower guide edge. These two guide edges are spaced apart from one another. The first upper guide edge and the first lower guide edge preferably cooperate to further facilitate limiting of the deflecting of the first driveshaft laterally.

A second guide boss is preferably included which is in this preferred embodiment made of aluminum and also is formed integrally with respect to the frame below the upper flange and above the lower flange at a position approximately halfway therebetween. The second guide boss is preferably positioned immediately adjacent the intermediate securement mechanism in order to facilitate maintaining of structural integrity of the frame thereadjacent and for minimizing lateral deflecting of the second driveshaft. This second guide boss preferably defines a second profile guide surface which is arcuate and at least partially encircled the second driveshaft. It is positioned thereadjacent for the purpose of preventing lateral deflection. The second profiled guide surface of the second guide boss is preferably located at a position adjacent the second driveshaft diametrically opposite from the tank holding zone thereadjacent in order to restrict lateral flexing of the second driveshaft away from the tank holding zone when firming securing a tank in place. The second profiled guide surface of the second guide boss is preferably laterally spaced from the second driveshaft at a distance of between five and ten thousandths of an inch. The second profiled guide surface of the guide boss is arcuate and extends through an arc of approximately 120 degrees to further limit this lateral flexing. The second profiled guide surface of the second guide boss preferably includes a second upper guide edge and a second lower guide edge. Preferably they are spaced apart from one another and cooperate together to further minimize deflecting of the second driveshaft.

An interengagement mechanism is also included which is operatively attached with respect to the first driveshaft mechanism and the second driveshaft mechanism for rotating both simultaneously. This interengagement mechanism is operative to rotate the first driveshaft counterclockwise and the second driveshaft clockwise simultaneously to move the first clamping means and the second clamping means toward the closed position for retaining of a tank within the tank holding zone. The interengagement means is operative to rotate the first driveshaft clockwise and the second driveshaft counterclockwise on the other hand simultaneously to move the first and second clamping devices toward the opened position to facilitate release of a tank from the tank holding zone.

In the preferred configuration of the present invention the first driveshaft is formed with a hexagonal cross-sectional shape such that it defines first flat zones with first protruding corner edges positioned therebetween. In this manner keying of the driveshaft with respect to the clamping arms is significantly enhanced to facilitate simultaneous rotation thereof. Similarly the second driveshaft is preferably formed with a hexagonal cross-sectional shape such that it defines second flat zones and second protruding corner edges positioned therebetween to facilitate keying of the second driveshaft relative to the clamping arms to enhance simultaneous rotation therebetween. In the configuration of the present invention the first protruding corner edges and the second protruding corner edges will be spaced from the arcuate surface of the first and second guide bosses at a distance of between five and ten thousandths of an inch to minimize lateral flexing thereof. Damage to the driveshafts will be minimized in view of the fact that they are preferably made of steel whereas the guide surfaces are made of aluminum which is a significantly softer and will disfigure rather than marring the steel driveshafts themselves which need to be maintained in good working condition at all times.

It is an object of the present invention to provide an improved quick release mechanical bracket for detachably retaining a tank therewithin which is particularly usable with cylindrical air tanks which has a minimum number of moving parts.

It is an object of the present invention to provide an improved quick release mechanical bracket for detachably retaining a tank therewithin which is particularly usable with cylindrical air tanks which can firmly secure a tank when held and easily and quickly release same for use.

It is an object of the present invention to provide an improved quick release mechanical bracket for detachably retaining a tank therewithin which is particularly usable with cylindrical air tanks which has minimal initial capital cost outlay.

It is an object of the present invention to provide an improved quick release mechanical bracket for detachably retaining a tank therewithin which is particularly usable with cylindrical air tanks which limits lateral flexing of the driveshafts powering the clamping arms which contact, abut and grip the tanks positioned therewithin within the tank holding zone.

It is an object of the present invention to provide an improved quick release mechanical bracket for detachably retaining a tank therewithin which is particularly usable with cylindrical air tanks which can include bosses positioned intermediate between the upper and lower flanges thereof which bosses include at least on profiled guide surface thereon for limiting lateral flexing of two vertically extending generally parallel oriented driveshafts.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figure 1:
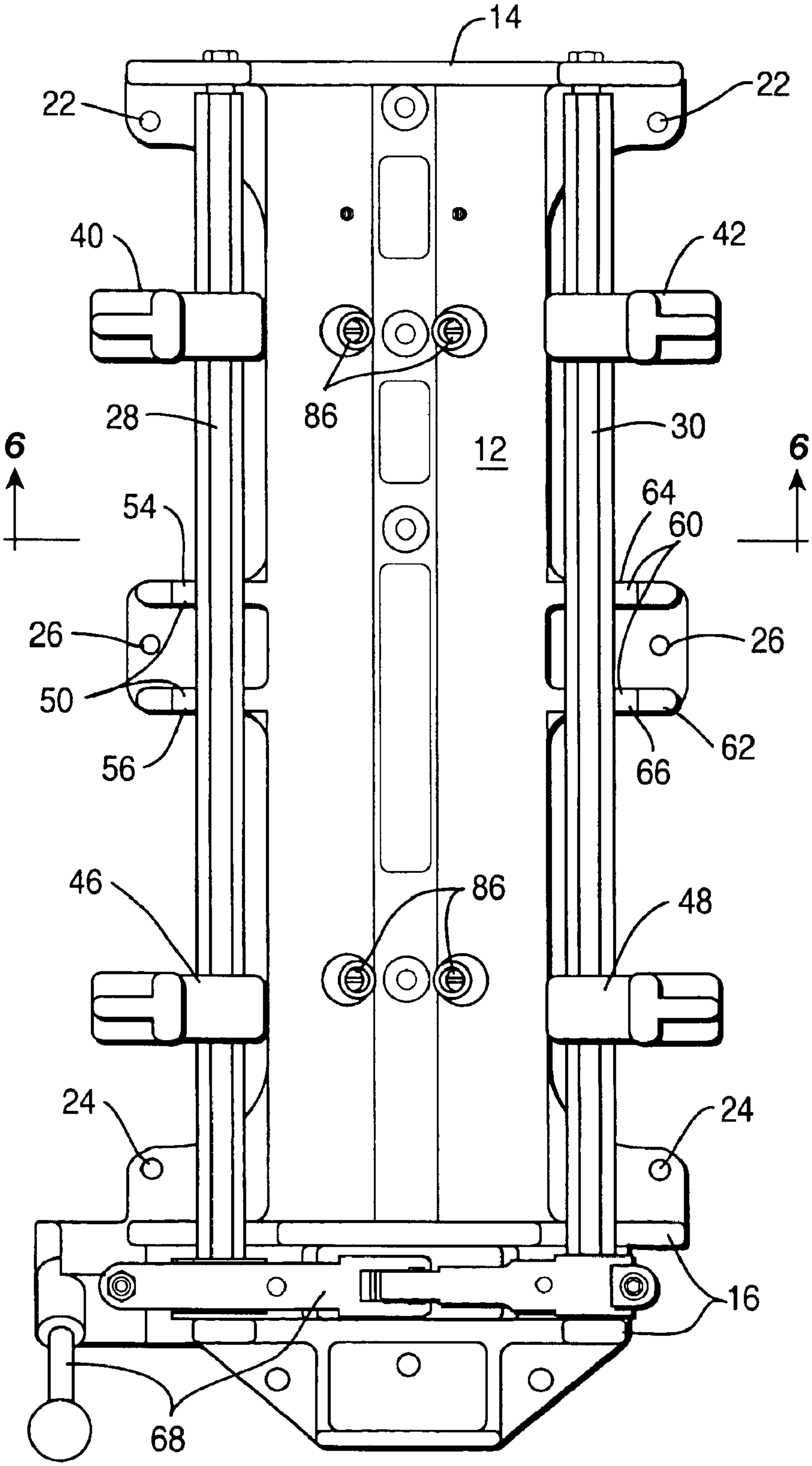
FIG. 1 is a front plan view of an embodiment of the improved quick release mechanical bracket of the present invention.
Figure 2:
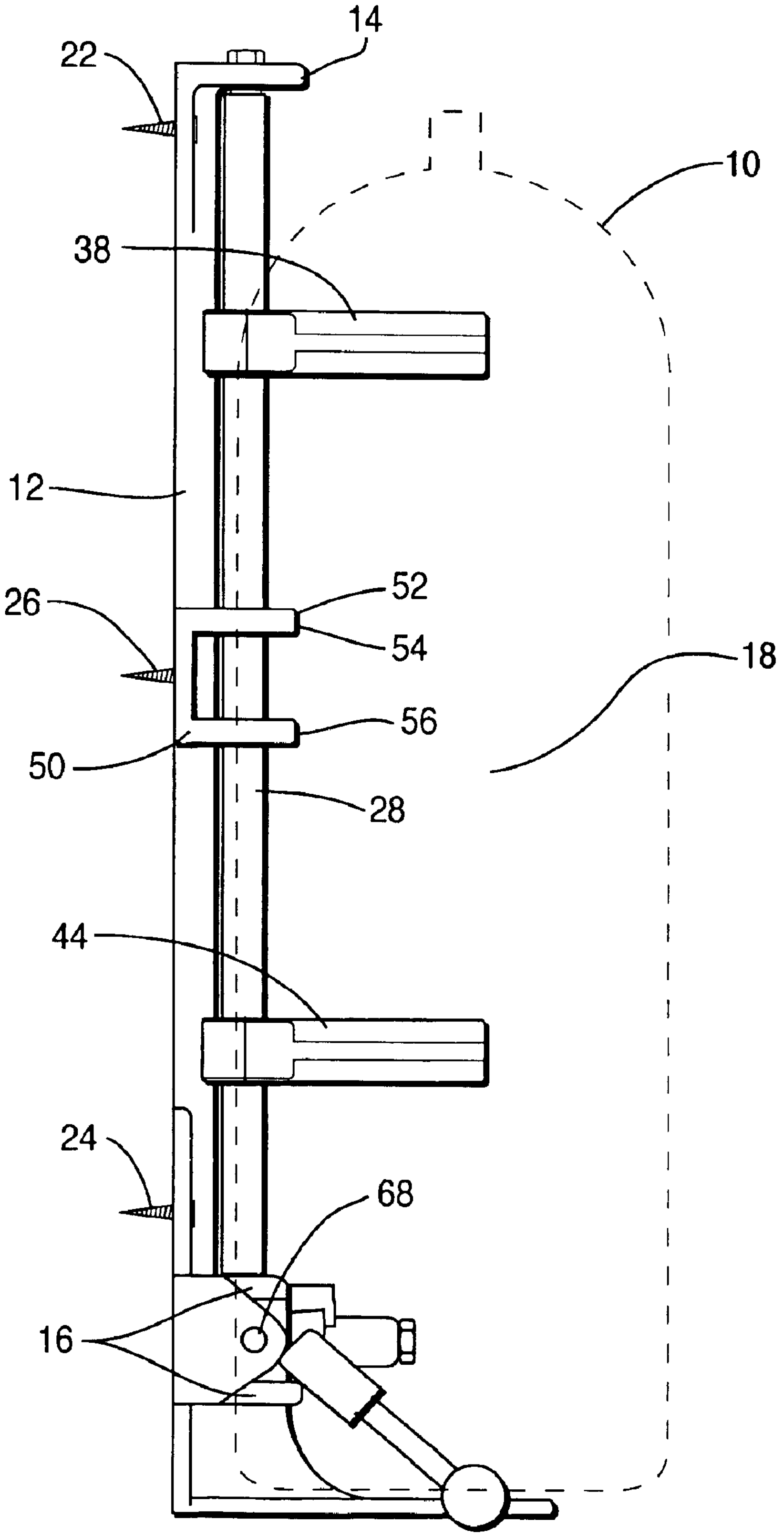
FIG. 2 is a side plan view of the embodiment shown in FIG. 1 taken from the left.
Figure 3:
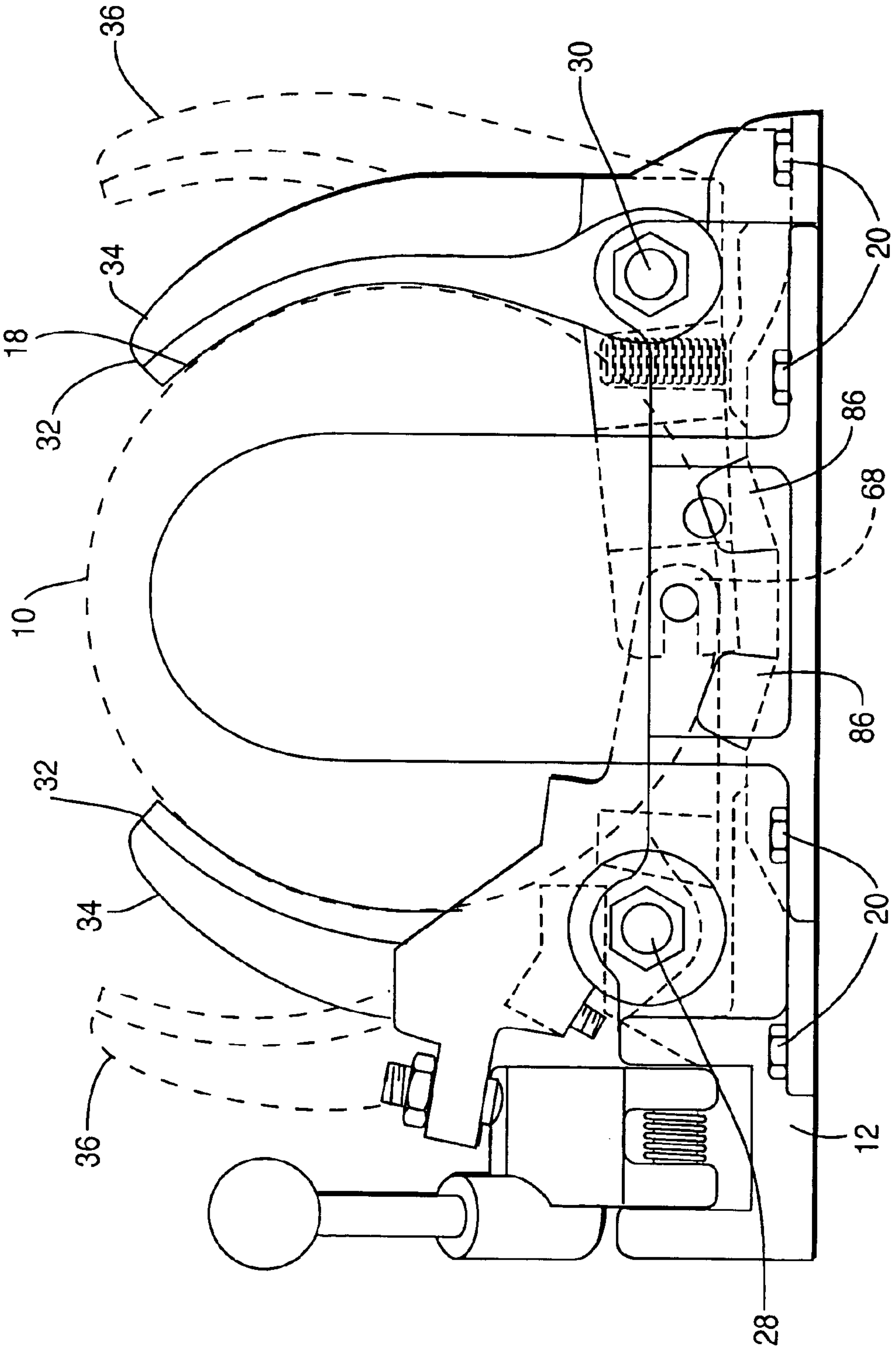
FIG. 3 is a bottom plan view of the embodiment shown in FIG. 1.
Figure 4:
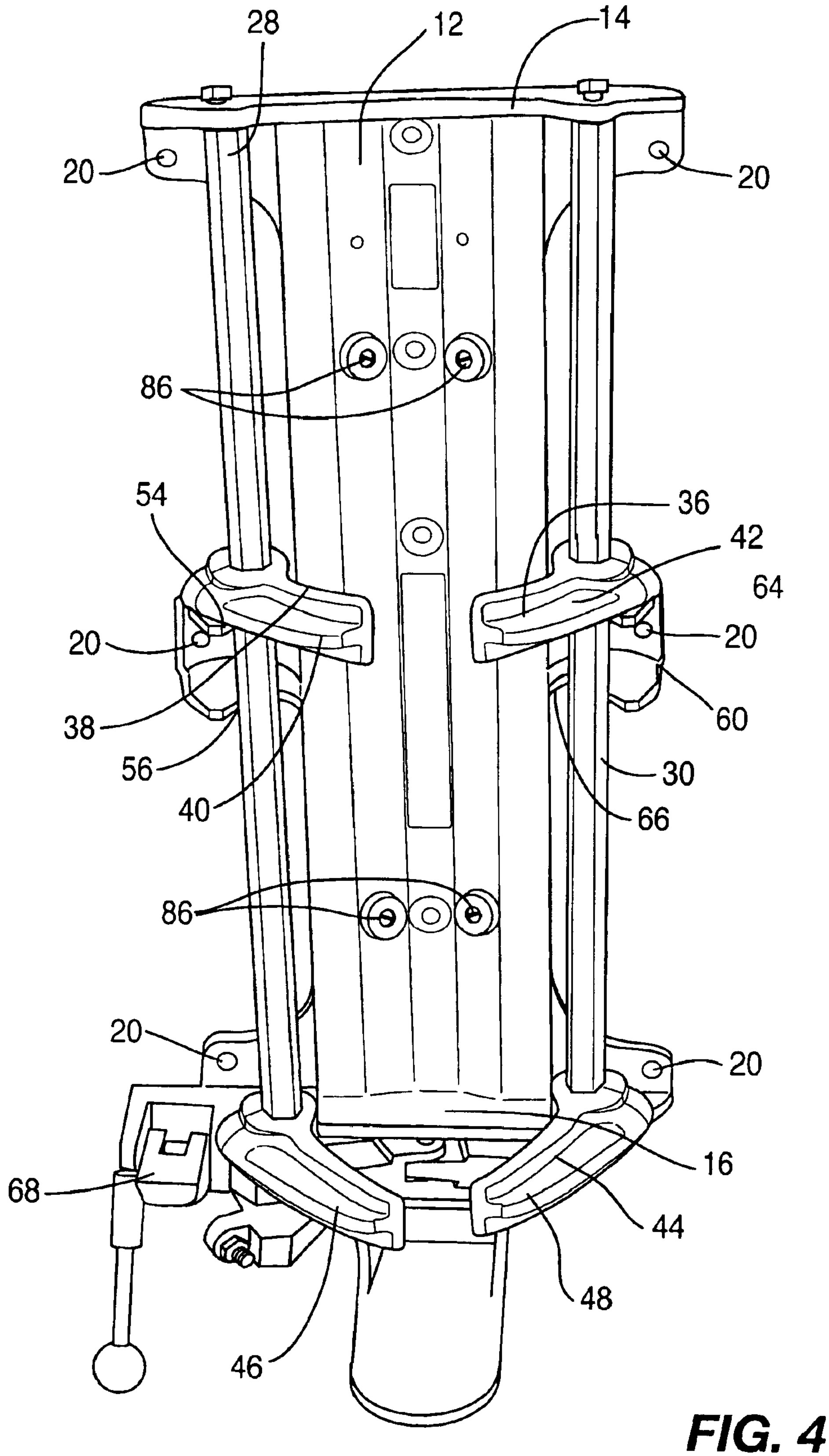
FIG. 4 is a front perspective illustration of the embodiment shown in FIG. 1.
Figure 5:
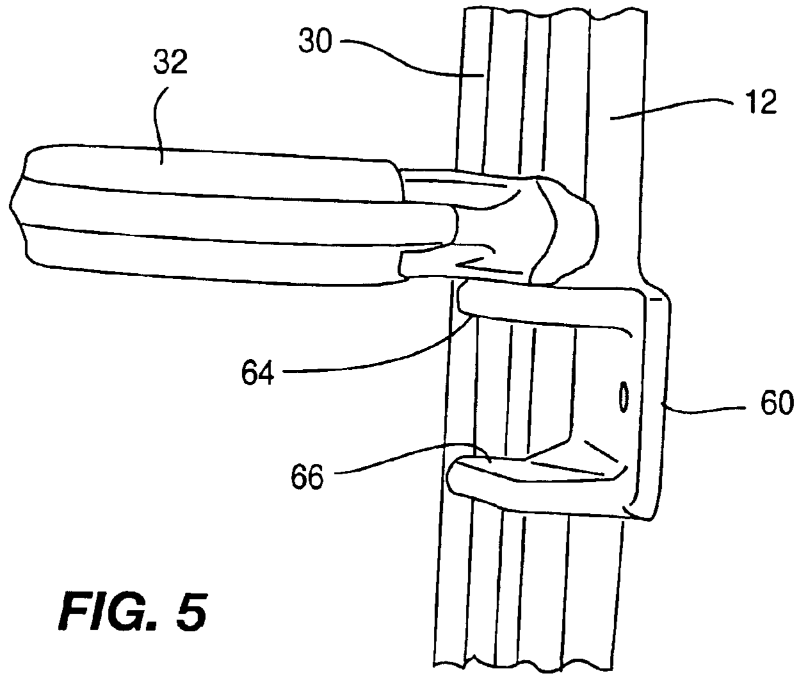
FIG. 5 is an exploded side plan view showing the cooperative interaction between the second guide boss and the second driveshaft.

The present invention provides a unique design for a quick release mechanical bracket configured for the purpose of detachably holding a tank 10 and preferably a cylindrical tank relative thereto detachably. This improved quick release mechanical bracket includes a frame 12 which is preferably made of cast aluminum. Frame 12 preferably includes an upper flange 14 extending outwardly therefrom near the upper portion of the frame 12 and a lower flange 16 extending outwardly therefrom near the lower portion of the frame 12. In this manner the upper flange 14 and the lower flange 16 define therebetween a tank holding zone 18 designed for detachably receiving and selectively retaining the cylindrical tank 10 therewithin as desired.

A securement apparatus 20 is preferably included for detachably affixing the frame 12 with respect to the surrounding environmental structure such as walls or the like. The securement apparatus 20 preferably comprises a plurality of holes defined in the frame 11 through which screws, bolts or lag bolts can extend to fixedly secure the frame 12 with respect to an environmental structure. Preferably an upper securement means 22 will be included which can comprise two threaded engagement bolts and two holes positioned near the upper flange 14. Also a lower securement means 24 can be included comprising holes defined in the frame 12 adjacent to the lower flange 16. Furthermore an intermediate securement mechanism 26 can be defined by the frame 12 below the upper securement means 22 and above the lower securement means 24 in such a manner as to fixedly secure the intermediate portion of the frame 12 with respect to the adjacently positioned environmental structure such as a wall or seat-back.

A first driveshaft 28 is included which is rotatably movable relative to the frame 12. First driveshaft 28 is preferably rotatably mounted within the upper flange 14 of frame 12 and is also rotatably mounted within the lower flange 16 of frame 12 and extends vertically therebetween. The first driveshaft 28 preferably is of hexagonal cross-section and defines a plurality of first flat zones 70 with a plurality of first protruding corner edges 72 positioned therebetween. Preferably the first driveshaft 28 will include six such first flat zones 70 since it is preferably hexagonal in cross-section and will include six first protruding corner edges 72 located therebetween.

A second driveshaft 30 is also included in this embodiment which is rotatably mounted with respect to the upper flange 14 and the lower flange 16 at a position laterally displaced from the point of movable securement of the first driveshaft 28 with respect thereto. The second driveshaft 30 as such will be rotatably movable within the upper and lower flanges 14 and 16 and will extend therebetween vertically in a direction extending approximately parallel to and laterally displaced from the first driveshaft means. The first driveshaft 28 and the second driveshaft 30 will define the tank holding zone 18 thereadjacent.

The second driveshaft 30 will also preferably assume a hexagonal cross-section with six second flat zones 74 defined about the outer periphery therearound with six second protruding corner edges 76 positioned between adjacent second flat zones 74. A tank clamping means 32 is preferably secured to the two driveshafts 28 and 30 and is movable between a closed position 34 for clamping and holding of a tank 10 within the tank holding zone 18 and an opened position 36 for allowing release of the tank therefrom.

In the preferred embodiment shown herein an upper tank clamping member 38 is included as well as a lower tank clamping member 44. The upper tank clamping member 38 includes a first upper clamping arm 40 fixedly secured to the first driveshaft 28 to be rotatable therewith. A second upper clamping arm 42 is secured to the second driveshaft 30 at a position immediately adjacent to the first upper clamping arm 40. In this manner first and second upper clamping arms 40 and 42 will cooperate and move simultaneously between the opened position 36 and the closed position 34. The lower tank clamping member 44 will also include a first lower clamping arm 46 as well as a second lower clamping arm 48. The first lower clamping arm 46 will be secured to the first driveshaft 28 to be rotatable therewith and the second lower clamping arm 48 will be secured to the second driveshaft 30 to be rotatably movable therewith. In this manner with coordinated movement between the first and second driveshafts 28 and 30 coordinated movement will be achieved between the first lower clamping arm 46 and the second lower clamping arm 48 causing simultaneous movement of both arms between the closed position 34 and the opened position 36 simultaneously.

An interengagement means 68 will be operatively secured with respect to the first driveshaft 28 and the second driveshaft 30 to cause simultaneous operation of each in the opposite direction. In this manner the first and second driveshaft members 28 and 30 will simultaneously move toward the closed position 34 and will simultaneously be moved toward the opened position 36 with the respective upper tank clamping member 38 and lower tank clamping member 44 fixedly secured to each. The configuration of the interengagement means can comprise many different designs only one of which is shown in this embodiment. The design shown in this embodiment works similar to that shown in U.S. Pat. No. 4,586,687 which is incorporated herein by reference and was invented and patented on May 6, 1986 by one of the inventors herein. That design is a predecessor design of the present invention and the means of operation of that interengagement means is hereby incorporated herewith for the purposes of illustration. However, it should be appreciated that any mechanism or interengagement means which causes simultaneous rotation of the first driveshaft and the second driveshaft such as to move them simultaneously between the closed position 34 and the opened position 36 would be operable with respect to the present invention.

It should be appreciated that a significant amount of force can be exerted against the tank 10 of the present invention by the upper tank clamping member 38 and the lower tank clamping member 44 and in particular the individual clamping arms thereof. These arms need to very firmly secure the tank 10 in position within the tank holding zone 18. This is important in order to prevent accidental falling of the tank from position secured to the mechanical bracket of the present invention. The type of quick release mechanical bracket utilizing the present invention is often utilized in emergency vehicles and such vehicles often experience significant amounts of lurching and vibration while driving quickly to an emergency situation such as a fire. As such, the forces needed to hold the tank 10 in place need to be extremely strong. As shown in the present invention rubber bumpers 86 can be included such that they can be compressed such that when a tank 10 is in the tank holding zone 18 and is firmly grasped therewithin by movement of the upper tank clamping member 38 and the lower tank clamping member 44 to the closed position 34 it will cause compression of these bumpers thereby providing a significant amount of force in multiple directions to aid in retaining of the cylindrical tank 10 firmly within the zone 18.

Figure 6:
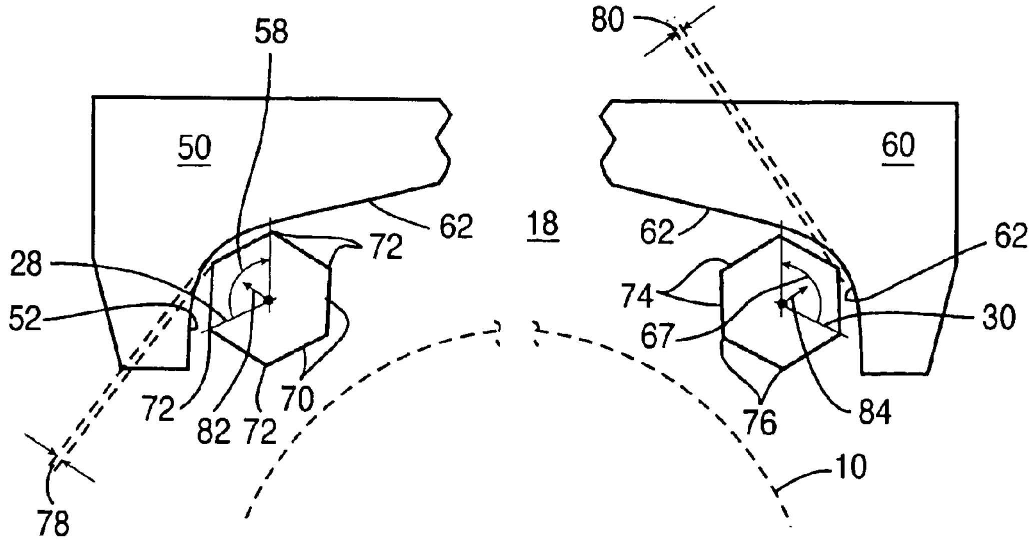
FIG. 6 is a top plan view of FIG. 1 taken along lines 6—6.

The significant amount of pressure that needs to be exerted in order to maintain such cylindrical tanks 10 firmly in securement tends to laterally flex the first driveshaft 28 and the second driveshaft 30 in a direction away from the tank holding zone. The present invention provides a unique improvement by defining guide bosses immediately thereadjacent for restricting this lateral flexing. For this purpose a first guide boss 50 is shown which prevents a first profiled guide surface 52 for limiting flexing of the first driveshaft 28 laterally away from the tank holding zone 18. The forces and operation of this system is best shown in FIG. 6. There the hexagonal cross-section of the first driveshaft 28 is clearly shown. Also the first profiled guide surface 52 which is generally arcuate of the boss guide boss 50 is clearly shown. The first profiled guide surface 52 is separated from the first drive shaft 28 by approximately 0.005 to 0.010 inches. In this manner flexing is greatly minimized so that the first driveshaft 28 will be maintained in a vertically standing direction parallel to the second driveshaft 30 even when fully clamped in position holding a tank 10 within the tank holding zone 18. It is preferable that the positioning of the first guide boss 50 be adjacent to the intermediate securement means 26 for facilitating stability in the overall structural integrity thereof. Also with this configuration it is preferable to form the driveshaft out of steel while the frame 12 and the guide boss 50 are formed of aluminum. In this manner damage to the first driveshaft 28 is eliminated if lateral flexing causes abutment thereof and in particular abutment of the first protruding corner edges 72 thereof with respect to the first profiled guide surface 52 which is formed preferably of cast aluminum. As shown further in FIG. 1, it is preferable that the first profiled guide surface 52 actually comprise two separate guide edges. That is, first guide boss 50 should include a first upper guide edge 54 and a first lower guide edge 56. These two guide edges will provide two points of abutment of the first guide boss 50 with respect to the first driveshaft 28 and in this manner further restrict lateral flexing thereof away from the tank holding zone 18.

A similar construction is preferably included by defining of a second guide boss 60 immediately adjacent to the second driveshaft 30. Second guide boss 60 preferably includes a second profiled guide surface 62 of aluminum which is spaced from the second driveshaft means 30 by a distance of between 0.005 and 0.010 inches in order to limit lateral flexing of driveshaft 30. The second guide boss 60 will preferably define a second profiled guide surface 62 and preferably two specific guide edges, namely, the second upper guide edge 64 and the second lower guide edge 66 as best shown in FIGS. 6 and 1 which will be adapted to abut the second driveshaft 38 if it flexes away from the tank holding zone 18.

Preferably the contour of the first profiled guide surface 52 and the second profiled guide surface 62 will extend through an arc of approximately 120 degrees as shown as first 120 degree arc 58 and second 120 degree arc 67 shown in FIG. 6. The hexagonal arc of approximately 120 degrees will allow the profiled guide surfaces 52 and 62 to contact three of the first protruding corner edges 72 and second protruding corner edges 76 responsive to lateral flexing of either the first driveshaft 28 or the second driveshaft 30 away from the tank holding zone 18. By the defining of the restricting profiles to approximately 120 degrees the rotational orientation of the driveshafts 28 and 30 will not have any impact on the ability of the profiled guide surfaces 52 and 62 to limit flexing of the adjacent driveshaft because at all times the profiled guiding surfaces will be capable of contacting at least two and as many as three of the protruding edges of the adjacently positioned driveshafts when configured with hexagonal cross-sections.

The arrow 82 in FIG. 6 shows the vector or the direction of the flexing force of the first driveshaft 28 which needs to be restricted by positioning of the first guide boss 50 appropriately. In a similar manner arrow 84 shows the vector of direction of the lateral flexing force exerted against the second driveshaft 30 which needs to be restricted by accurate and careful positioning of the second guide boss 60. Also in this figure, arrows 78 show the limited lateral clearance or spacing distance between the first protruding edges 72 of the first driveshaft 28 and the first profiled guide surface 52 of figure guide boss 50. In a similar manner arrows 80 show the second spacing distance which is also preferably 0.005 to 0.010 inches between the second protruding corner edges 76 of the second driveshaft 30 and the immediately adjacently positioned second profiled guide surface 62 of second guide boss 60. Choice of materials is another important consideration of the present invention. By choosing the frame 12 and the preferably integrally formed first and second guide bosses 50 and 60 to be made of cast aluminum will allow them to be softer than the adjacently located driveshaft which is preferably made of steel. In this manner damage to either the first driveshaft 28 or the second drive shaft 30 by contacting thereof with respect to the first guide boss 50 or the second guide boss 60 will be prevented.

As such, the present invention provides a unique guiding means for maintaining the integrity of the two vertically extending driveshafts 28 and 30. It is important that these rotatable parts be maintained in parallel relationship with respect to one another and not become flexed to a position such that they are no longer aligned in order to maintain full efficiency of operation thereof.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An improved quick release mechanical bracket movable between a closed position for detachably retaining a tank therewithin and an opened position for release thereof comprising:

A. a frame means extending vertically including:
  (1) an upper flange means extending outwardly therefrom;
  (2) a lower flange means extending outwardly therefrom at a position spatially disposed below said upper flange means to define a tank holding zone therebetween;

B. a first driveshaft means rotatably mounted within said upper flange means and rotatably mounted within said lower flange means and extending therebetween;

C. a second driveshaft means rotatably mounted within said upper flange means at a position laterally spatially disposed from said first driveshaft means, said second driveshaft means being rotatably mounted within said lower flange means at a position spatially disposed laterally from said first driveshaft means, said second driveshaft means extending vertically between said upper flange means and said lower flange means at a position laterally displaced from said first driveshaft means, said second driveshaft means and said first driveshaft means extending vertically approximately parallel with respect to one another to define said tank holding zone therebetween below said upper flange means and above said lower flange means;

D. at least one tank clamping means secured to said first driveshaft means and said second driveshaft means and being movable therewith between said closed position retaining said tank within said tank holding zone and an opened position releasing a tank to allow removal thereof from said tank holding zone, each of said tank clamping means including;
  (1) a first clamping arm means secured to said first driveshaft means to be rotatably movable therewith between a closed position for gripping and an opened position for releasing;
  (2) a second clamping arm means secured to said second driveshaft means and rotatably movable therewith between a closed position for gripping and an opened position for releasing;

E. a first guide boss means fixedly secured to said frame means below said upper flange means and above said lower frame means at a position intermediate therebetween adjacent said first driveshaft means, said first guide boss means defining a first profiled guide surface at least partially encircling said first driveshaft means and positioned thereadjacent to prevent lateral deflection thereof;

F. a second guide boss means fixedly secured to said frame means below said upper flange means and above said lower frame means at a position intermediate therebetween adjacent said second driveshaft means, said second guide boss means defining a second profiled guide surface at least partially encircling said second driveshaft means and positioned thereadjacent to prevent lateral deflection thereof; and G. an interengagement means operatively attached with respect to said first driveshaft means and said second driveshaft means for rotating both simultaneously, said interengagement means being operative to rotate said first driveshaft means counterclockwise and said second driveshaft means clockwise simultaneously to move said first clamping means and said second clamping means toward the closed position, said interengagement means being operative to rotate said first driveshaft means clockwise and said second driveshaft means counterclockwise simultaneously to move said first clamping means and said second clamping means toward the opened position.

2. An improved quick release mechanical bracket as defined in claim 1 wherein said first profiled guide surface of said first guide boss means is positioned adjacent said first driveshaft means diametrically opposite from said tank holding zone to restrict lateral flexing of said first driveshaft means away from said tank holding zone and wherein said second profiled guide surface of said second guide boss means is positioned adjacent said second driveshaft means diametrically opposite from said tank holding zone to restrict lateral flexing of said second driveshaft means away from said tank holding zone.

3. An improved quick release mechanical bracket as defined in claim 1 wherein said first profiled guide surface of said first guide boss means is laterally spaced from said first driveshaft means at a distance of less than 0.015 inches and wherein said second profiled guide surface of said second guide boss means is laterally spaced from said second driveshaft means at a distance of less than 0.015 inches.

4. An improved quick release mechanical bracket as defined in claim 1 wherein said first profiled guide surface of said first guide boss means is laterally spaced from said first driveshaft means at a distance of between 0.005 and 0.010 inches inclusively and wherein said second profiled guide surface of said second guide boss means is laterally spaced from said second driveshaft means at a distance of between 0.005 and 0.010 inches inclusively.

5. An improved quick release mechanical bracket as defined in claim 1 wherein said first profiled guide surface is arcuate and wherein said second profiled guide surface is arcuate.

6. An improved quick release mechanical bracket as defined in claim 1 wherein said first profiled guide surface of said first guide boss means extends through an arc of greater than 90 degrees and less than 270 degrees to further limit lateral deflecting of said first driveshaft means and wherein said second profiled guide surface of said second guide boss means extends through an arc of greater than 90 degrees and less than 270 degrees to further limit lateral deflecting of said second driveshaft means.

7. An improved quick release mechanical bracket as defined in claim 1 wherein said first profiled guide surface of said first guide boss means extends through an arc approximately 120 degrees to further limit lateral deflecting of said first driveshaft means and wherein said second profiled guide surface of said second guide boss means extends through an arc of approximately 120 degrees to further limit lateral deflecting of said second driveshaft means.

8. An improved quick release mechanical bracket as defined in claim 1 wherein said first profiled guide surface of said first guide boss means includes a first upper guide edge and a first lower guide edge spaced apart from said first upper guide edge to further prevent deflection of said first driveshaft means laterally and wherein said second profiled guide surface of said second guide boss means includes a second upper guide edge and a second lower guide edge spaced apart from said second upper guide edge to further prevent deflection of said second driveshaft means laterally.

9. An improved quick release mechanical bracket as defined in claim 1 wherein said first driveshaft means is of hexagonal cross-sectional shape defining first flat zones with first protruding corner edges between adjacent of said first flat zones to facilitate keying thereof with respect to said tank clamping means and to facilitate simultaneous rotation thereof between the closed position and opened position and wherein said first profiled guide surface is spaced at approximately 0.005 to 0.010 inches from said first protruding corner edges for selective abutment therewith responsive to lateral deflection of said first driveshaft for minimizing thereof.

10. An improved quick release mechanical bracket as defined in claim 1 wherein said second driveshaft means is of hexagonal cross-sectional shape defining second flat zones with second protruding corner edges between adjacent of said second flat zones to facilitate keying thereof with respect to said tank clamping means and to facilitate simultaneous rotation thereof between the closed position and opened position and wherein said second profiled guide surface is spaced at approximately 0.005 to 0.010 inches from said second protruding corner edges for selective abutment therewith responsive to lateral deflection of said second driveshaft for minimizing thereof.

11. An improved quick release mechanical bracket as defined in claim 1 wherein said first driveshaft means and said second driveshaft means are made of steel and wherein said first guide boss means and said second guide boss means are made of cast aluminum to minimize wear of said first driveshaft means and said second driveshaft means responsive to lateral deflection thereof causing abutment thereof with respect to said first guide boss means and said second guide boss means, respectively.

12. An improved quick release mechanical bracket as defined in claim 1 wherein said first guide boss means is positioned adjacent said first driveshaft means at a position halfway between said upper flange means thereabove and said lower flange means therebelow and wherein said second guide boss means is positioned adjacent said second driveshaft means at a position halfway between said upper flange means thereabove and said lower flange means therebelow.

13. An improved quick release mechanical bracket as defined in claim 1 wherein said first guide boss means and said second guide boss means are integrally formed with respect to said frame means.

14. An improved quick release mechanical bracket as defined in claim 1 wherein said frame means includes a securement apparatus for facilitating mounting of said frame means to environmental structure, said securement apparatus including:

A. an upper securement means positioned adjacent said upper flange means;

B. a lower securement means positioned adjacent said lower flange means; and

C. an intermediate securement means positioned immediately adjacent said first guide boss means and said second guide boss means for facilitating maintaining of structural integrity thereof in order to minimize lateral deflecting of said first driveshaft means and said second driveshaft means, respectively.

15. An improved quick release mechanical bracket movable between a closed position for detachably retaining a tank therewithin and an opened position for release thereof comprising:

A. a frame means extending vertically including;

(1) an upper flange means extending outwardly therefrom;

(2) a lower flange means extending outwardly therefrom at a position spatially disposed below said upper flange means to define a tank holding zone therebetween;

B. a first driveshaft means rotatably mounted within said upper flange means and rotatably mounted within said lower flange means and extending therebetween;

C. a second driveshaft means rotatably mounted within said upper flange means at a position laterally spatially disposed from said first driveshaft means, said second driveshaft means being rotatably mounted within said lower flange means at a position spatially disposed laterally from said first driveshaft means, said second driveshaft means extending vertically between said upper flange means and said lower flange means at a position laterally displaced from said first driveshaft means, said second driveshaft means and said first driveshaft means extending vertically approximately parallel with respect to one another to define said tank holding zone therebetween below said upper flange means and above said lower flange means;

D. a tank clamping means secured to said first driveshaft means and said second driveshaft means and being movable therewith between said closed position retaining, said tank within said tank holding zone and an opened position releasing a tank to allow removal thereof from said tank holding zone, said tank clamping means including;

(1) an upper tank clamping member including (a) a first upper clamping arm means;

(b) a second upper clamping arm means, said first upper clamping arm means being secured to said first driveshaft means at a position thereon closer to said upper flange means than to said lower flange means and said second upper clamping arm means being secured to said second driveshaft means at a position thereon closer to said upper flange means than to said lower flange means;

(2) a lower tank clamping member including;

(a) a first lower clamping arm means;

(b) a second lower clamping arm means, said first lower clamping arm means being secured to said first driveshaft means at a position thereon closer to said lower flange means than to said upper flange means and said second lower clamping arm means being secured to said second driveshaft means at a position thereon closer to said lower flange means than to said upper flange means;

E. a first guide boss means formed integrally with said frame means below said upper flange means and above said lower frame means at a position intermediate therebetween adjacent said first driveshaft means, said first guide boss means defining a first profiled guide surface being arcuate and at least partially encircling said first driveshaft means and positioned thereadjacent to prevent lateral deflection thereof, said first profiled guide surface of said first guide boss means being positioned adjacent said first driveshaft means diametrically opposite from said tank holding zone to restrict lateral flexing of said first driveshaft means away from said tank holding zone, said first profiled guide surface of said first guide boss means being laterally spaced from said first driveshaft means at a distance of less than 0.015 inches, said first profiled guide surface of said first guide boss means extending through an arc of greater than 90 degrees and less than 270 degrees to further limit lateral deflecting of said first driveshaft means, said first guide boss means being positioned adjacent said first driveshaft means at a position halfway between said upper flange means thereabove and said lower flange means therebelow, said first profiled guide surface including:

(1) a first upper guide edge;

(2) a first lower guide edge spaced apart from said first upper guide edge, said first upper guide edge and said first lower guide edge cooperating to further prevent deflection of said first driveshaft means laterally;

F. a second guide boss means formed integrally with said frame means below said upper flange means and above said lower frame means at a position intermediate therebetween adjacent said second driveshaft means, said second guide boss means defining a second profiled guide surface being arcuate and at least partially encircling said second driveshaft means and positioned thereadjacent to prevent lateral deflection thereof, said second profiled guide surface of said second guide boss means being positioned adjacent said second driveshaft means diametrically opposite from said tank holding zone to restrict lateral flexing of said second driveshaft means away from said tank holding zone, said second profiled guide surface of said second guide boss means being laterally spaced from said second driveshaft means at a distance of less than 0.015, said second profiled guide surface of said second guide boss means extending through an arc of greater than 90 degrees and less than 270 degrees to further limit lateral deflecting of said second driveshaft means, said second guide boss means being positioned adjacent said second driveshaft means at a position halfway between said upper flange means thereabove and said lower flange means therebelow, said second profiled guide surface of said second guide boss means including:

(1) a second upper guide edge;

(2) a second lower guide edge spaced apart from said second upper guide edge, said second lower guide edge and said second upper guide edge cooperating together to further prevent deflection of said second driveshaft means laterally; and G. an interengagement means operatively attached with respect to said first driveshaft means and said second driveshaft means for rotating both simultaneously, said interengagement means being operative to rotate said first driveshaft means counterclockwise and said second driveshaft means clockwise simultaneously to move said first clamping means and said second clamping means toward the closed position for retaining of a tank within said tank holding zone, said interengagement means being operative to rotate said first driveshaft means clockwise and said second driveshaft means counterclockwise simultaneously to move said first clamping means and said second clamping means toward the opened position for releasing of a tank from within said tank holding zone.

16. An improved quick release mechanical bracket movable between a closed position for detachably retaining a tank therewithin opened position for release thereof comprising:

A. a frame means of aluminum extending vertically including;

(1) an upper flange means extending outwardly therefrom;

(2) a lower flange means extending outwardly therefrom at a position spatially disposed below said upper flange means to define a tank holding zone therebetween;

(3) a securement apparatus for facilitating mounting of said frame means to environmental structure, said securement apparatus including:

(a) an upper securement means positioned adjacent said upper flange means;

(b) a lower securement means positioned adjacent said lower flange means;

(c) an intermediate securement means positioned at an intermediate position below said upper securement means and above said lower securement means to facilitate fixed securement of said frame means to environmental structure;

B. a first driveshaft means made of steel and rotatably mounted within said upper flange means and rotatably mounted within said lower flange means and extending therebetween;

C. a second driveshaft means made of steel and rotatably mounted within said upper flange means at a position laterally spatially disposed from said first driveshaft means, said second driveshaft means being rotatably mounted within said lower flange means at a position spatially disposed laterally from said first driveshaft means, said second driveshaft means extending vertically between said upper flange means and said lower flange means at a position laterally displaced from said first driveshaft means, said second driveshaft means and said first driveshaft means extending vertically approximately parallel with respect to one another to define said tank holding zone therebetween below said upper flange means and above said lower flange means;

D. a tank clamping means secured to said first driveshaft beans and said second driveshaft means and being movable therewith between a closed position retaining a tank within said tank holding zone and an opened position releasing a tank to allow removal thereof from said tank holding zone, said tank clamping means including;

(1) an upper tank clamping member including (a) a first upper clamping arm means;

(b) a second upper clamping arm means, said first upper clamping arm means being secured to said first driveshaft means at a position thereon closer to said upper flange means than to said lower flange means and said second upper clamping arm means being secured to said second driveshaft means at a position thereon closer to said upper flange means than to said lower flange means;

(2) a lower tank clamping member including;

(a) a first lower clamping arm means;

(b) a second lower clamping arm means, said first lower clamping arm means being secured to said first driveshaft means at a position thereon closer to said lower flange means than to said upper flange means and said second lower clamping arm means being secured to said second driveshaft means at a position thereon closer to said lower flange means than to said upper flange means;

E. a first guide boss means of aluminum and formed integrally with said frame means below said upper flange means and above said lower frame means at a position intermediate therebetween adjacent said first driveshaft means, said first guide boss means positioned immediately adjacent said intermediate securement means in order to facilitate maintaining of structural integrity of said frame means thereadjacent for minimizing lateral deflecting of said first driveshaft mean, said first guide boss means defining a first profiled guide surface being arcuate and at least partially encircling said first driveshaft means and positioned thereadjacent to prevent lateral deflection thereof, said first profiled guide surface of said first guide boss means being positioned adjacent said first driveshaft means diametrically opposite from said tank holding zone to restrict lateral flexing of said first driveshaft means away from said tank holding zone, said first profiled guide surface of said first guide boss means being laterally spaced from said first driveshaft means at a distance of 0.005 to 0.010 inches, said first profiled guide surface of said first guide boss means extending through an arc of approximately 120 degrees to further limit lateral deflecting of said first driveshaft means, said first guide boss means being located at an intermediate position adjacent said first driveshaft means below said first upper clamping arm means and above said first lower clamping arm means to minimize lateral deflection of said first driveshaft means, said first guide boss means being positioned adjacent said first driveshaft means at a position halfway between said upper flange means thereabove and said lower flange means therebelow, said first profiled guide surface including:

(1) a first upper guide edge;

(2) a first lower guide edge spaced apart from said first upper guide edge, said first upper guide edge and said first lower guide edge cooperating to further prevent deflection of said first driveshaft means laterally;

F. a second guide boss means of aluminum and formed integrally with said frame means below said upper flange means and above said lower frame means at a position intermediate therebetween adjacent said second driveshaft means, said second guide boss means positioned immediately adjacent said intermediate securement means in order to facilitate maintaining of structural integrity of said frame means thereadjacent for minimizing lateral deflecting of said second driveshaft means, said second guide boss means defining a second profiled guide surface being arcuate and at least partially encircling said second driveshaft means and positioned thereadjacent to prevent lateral deflection thereof, said second profiled guide surface of said second guide boss means being positioned adjacent said second driveshaft means diametrically opposite from said tank holding zone to restrict lateral flexing of said second driveshaft means away from said tank holding zone, said second profiled guide surface of said second guide boss means being laterally spaced from said second driveshaft means at a distance between 0.005 to 0.010 inches, said second profiled guide surface of said second guide boss means extending through an arc of approximately 120 degrees to further limit lateral deflecting of said second driveshaft means, said second guide boss means being located at an intermediate position adjacent said second driveshaft means below said second upper clamping arm means and above said second lower clamping arm means to minimize lateral deflection of said second driveshaft means, said second guide boss means being positioned adjacent said second driveshaft means at a position halfway between said upper flange means thereabove and said lower flange means therebelow, said second profiled guide surface of said second guide boss means including:

(1) a second upper guide edge;

(2) a second lower guide edge spaced apart from said second upper guide edge, said second lower guide edge and said second upper guide edge cooperating together to further prevent deflection of said second driveshaft means laterally; and G. an interengagement means operatively attached with respect to said first driveshaft means and said second driveshaft means for rotating both simultaneously, said interengagement means being operative to rotate said first driveshaft means counterclockwise and said second driveshaft means clockwise simultaneously to move said first clamping means and said second clamping means toward the closed position for retaining of a tank within said tank holding zone, said interengagement means being operative to rotate said first driveshaft means clockwise and said second driveshaft means counterclockwise simultaneously to move said first clamping means and said second clamping means toward the opened position for releasing of a tank from within said tank holding zone.

* * * * *

UNITED STATES PATENT AND TRADEMARK OFFICE

CERTIFICATE OF CORRECTION

PATENT NO. : 6,883,766 B1

DATED : April 26, 2005

INVENTOR(S) : Michael Paul Ziaylek, Theodore Ziaylek, Jr. and Theodore P. Ziaylek It is certified that error appears in the above-identified patent and that said Letters Patent is hereby corrected as shown below:

Column 15,

Line 32, change "beans" to -- means --.

Signed and Sealed this

Twenty-third Day of August, 2005

JON W. DUDAS

*Director of the United States Patent and Trademark Office*